US007593426B1

(12) United States Patent
Lee et al.

(10) Patent No.: US 7,593,426 B1
(45) Date of Patent: Sep. 22, 2009

(54) BIT RATE AND POWER ALLOCATION FOR MULTI-CARRIER COMMUNICATION SYSTEMS

(75) Inventors: Jungwon Lee, Stanford, CA (US); John M. Cioffi, Atherton, CA (US); Seong Taek Chung, San Diego, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 803 days.

(21) Appl. No.: 10/842,710

(22) Filed: May 10, 2004

Related U.S. Application Data

(60) Provisional application No. 60/469,359, filed on May 9, 2003, provisional application No. 60/469,360, filed on May 9, 2003.

(51) Int. Cl.
*H04J 3/16* (2006.01)
*H04J 3/00* (2006.01)
(52) U.S. Cl. .................................. 370/468; 370/464
(58) Field of Classification Search ................. 370/468, 370/464
See application file for complete search history.

(56) References Cited

U.S. PATENT DOCUMENTS

| 5,479,447 | A | 12/1995 | Chow et al. | |
| 5,751,701 | A | 5/1998 | Langberg et al. | |
| 6,222,888 | B1* | 4/2001 | Kao et al. | 375/260 |
| 7,003,044 | B2* | 2/2006 | Subramanian et al. | 375/260 |
| 7,103,004 | B2* | 9/2006 | Wang | 370/252 |
| 7,151,803 | B1* | 12/2006 | Sonalkar | 375/260 |
| 2004/0213293 | A1* | 10/2004 | Basso et al. | 370/480 |
| 2006/0171480 | A1* | 8/2006 | Erving et al. | 375/260 |

FOREIGN PATENT DOCUMENTS

WO       WO 02/10008 A1    12/2002

OTHER PUBLICATIONS

Lee, J., "Power Allocation for Multi-User Multi-Carrier Communication Systems," Stanford University, Stanford, CA.
Wong, C.Y., Cheng, R., Letaief, K.B., and Murch, R., "Multiuser OFDM with Adaptive Subcarrier, Bit, and Power Allocation," IEEE Journal on Selected Areas in Communications, vol. 17, No. 10, Oct. 1999, pp. 1747-1757.
Kim, I., Lee, H.L., Kim, B., and Yong, H.L., "On the Use of Linear Programming for Dynamic Subchannel and Bit Allocation in Multiuser OFDM," IEEE, 2001, pp. 3648-3652.

* cited by examiner

*Primary Examiner*—Barry W Taylor
(74) *Attorney, Agent, or Firm*—Crawford Maunu PLLC

(57) ABSTRACT

Approaches to operating a multi-user, multi-carrier communication system involve allocating a target bit rate across user channels and subchannels to adjust the power. The target bit rate is allocated among subchannels of the user channels as a function of system power associated with the subchannel bit rate allocation. The target bit is allocated among user channels of the communication system as a function of system power associated with the user bit rate allocation. The power allocation for each user channel is determined based on the bit rate allocation.

43 Claims, 18 Drawing Sheets

BIT RATE AND POWER ALLOCATION FOR MULTI-CARRIER COMMUNICATION SYSTEMS

RELATED PATENT DOCUMENTS

This application claims the benefit of Provisional Patent Application Ser. Nos. 60/469,359 and 60/469,360, filed on May 9, 2003, to which priority is claimed pursuant to 35 U.S.C. §119(e) and which are hereby incorporated herein by reference in their respective entireties.

FIELD OF THE INVENTION

The present invention relates generally to communication systems, and more specifically to allocation of bit rate and power in multi-carrier communication systems.

BACKGROUND OF THE INVENTION

Digital data transmission provides high-speed communications for a variety of applications. Digital communication over existing telephone system infrastructure, e.g., twisted pair lines, has been implemented to provide service to homes and businesses accessible over existing telephone lines. Various digital communication systems, such as digital subscriber line (DSL), have associated standards enabling communication between users over twisted pair lines.

DSL modems use frequencies above the traditional voice band to carry high-speed data. Discrete multitone (DMT) modulation is a technique used to partition a DSL communication channel into N independent additive white Gaussian noise (AWGN) subchannels. Dividing the DSL channel into subchannels reduces intersymbol interference (ISI), thus reducing complexity at the receiver. However, partitioning the channel into multiple carriers introduces the problem of determining the power and data rate of each carrier at the transmitter.

Existing telephone lines are typically arranged in a binder with a number of wire pairs in each binder. Crosstalk interference between twisted pairs arising from electromagnetic coupling within the binder may degrade the communication signals. When the level of crosstalk is high, the power allocation of a user changes the noise experienced by the other users in the same binder. Near end crosstalk (NEXT) refers to crosstalk created by transmitters located on the same side as the receiver. Far end crosstalk (FEXT) refers to crosstalk created by transmitters on opposite sides. NEXT is typically much larger than FEXT. Crosstalk can be the limiting factor in determining the data rates of offered DSL services at various loop lengths. In this case, the performance of DSL modems can be improved by jointly considering the bit and power allocation of all users.

DSL channels are significantly frequency selective, and effective DSL power allocation schemes take into account the allocation of power in each carrier frequency as well as the total amount of power allocated for each user. Some types of DSL, e.g., very high speed DSL (VDSL) are particularly affected by a near-far problem when two transmitters located at different distances from the central office both attempt to communicate with the central office. When one transmitter is much closer to the central office, the interference due to the closer transmitter may overwhelm the signal from the far transmitter. As the distance from the central office increases, the signal quality decreases and the connection speed goes down.

Various techniques have been devised for allocating power and rate to subchannels to improve performance in multi-carrier systems. These techniques involve, for example, rate maximization to increase the data rate under a fixed data constraint, or margin maximization, wherein the transmit power is minimized for a fixed rate. Many of these techniques are suboptimal and computationally efficient, or are optimal, but computationally prohibitive. There is a need for practically implementable rate and power allocation solutions that address the above problems.

SUMMARY OF THE INVENTION

The present invention involves allocation of bit rate and power in multi-carrier communication systems. One embodiment of the invention involves a method of operating a multi-carrier communication system. In accordance with this method, a target bit rate is provided for a user channel of the communication system. A target bit rate is allocated among subchannels of the user channel as a function of channel power associated with the bit rate allocation. The power allocation for the user channel is calculated based on the bit rate allocation.

Another embodiment of the invention involves a method of operating a multi-user, multi-carrier communication system. A target bit rate is provided for the communication system. The target bit rate is allocated among user channels of the communication subsystem and among subchannels of the user channels. The target bit rate is allocated among subchannels of the communication system as a function of system power associated with the subchannel bit rate allocation. The target bit is allocated among user channels of the communication system as a function of system power associated with the user bit rate allocation. The power allocation for each user channel is determined based on the bit rate allocation.

In accordance with yet another embodiment of the invention, a communication system includes one or more user channels. Each user channel includes a transmitter and a receiver. The transmitter is configured to transmit data over a multi-carrier channel. The receiver is communicatively coupled to the transmitter through the multi-carrier channel and is configured to receive the transmitted data. The system also includes control circuitry coupled to the one or more user channels. The control circuitry provides a target bit rate for each user channel. The control circuitry also allocates the target bit rate among user channels and/or subchannels of each user channel as a function of system power associated with the bit rate allocation. The control system determines a power allocation for each user channel based on the bit rate allocation.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
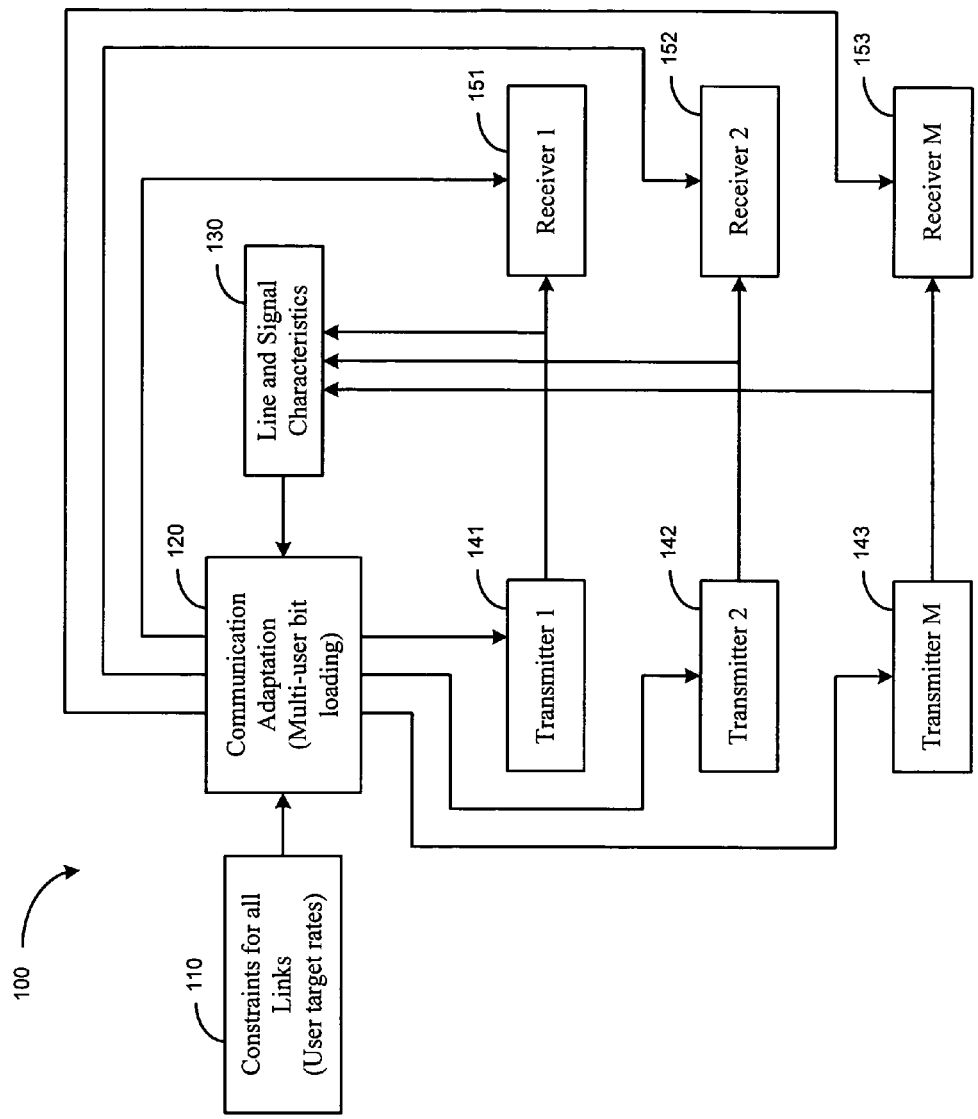
FIG. 1 is a block diagram of a communication system configured to implement centralized multi-user bit and power allocation methodologies in accordance with embodiments of the invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

Various embodiments of the invention are directed to methods and systems for adjusting communication parameters to improve system performance. Adjusting communication parameters includes, for example, initializing and/or modifying data rate and power allocations to users and/or to frequency subchannels of a multi-carrier communication system. Knowledge of line and signal characteristics of the system communication links may be used in adjusting the communication parameters for the system components.

Modifying the power of any user may increase the interference experienced by other users, degrading the communication signals of other users. System and power allocation may be enhanced by taking into account the interference experienced by users of the communication system caused by changing the power allocation of neighboring users. Communication parameter adjustment techniques according to various embodiments involve distributing a target rate across users or frequency subchannels as a function of the power required to implement the data rate allocation.

Data rate and power allocation may occur during initialization of the system or during ongoing operations. Some embodiments involve centralized collection of signal and line information to implement the allocation. Other embodiments employ a distributed approach.

FIG. 1 is a block diagram illustrating a digital communication system 100 that may be used to implement a multi-user rate and power allocation method in accordance with an embodiment of the invention. A data stream is decomposed in a first transceiver 141, 142, 143 into multiple component data streams and modulated. The modulated component data streams are transmitted to a second transceiver 151, 152, 153. The signal is demodulated and recomposed in the second transceiver 151, 152, 153. A data stream may be transmitted in the opposite direction by reversing the process.

The digital communication system 100 of FIG. 1 uses transceiver pairs 141, 151, 142, 152, 143, 153 that are linked via a communication cable. For example, communication may occur over a twisted pair cable such as that typically used for telephone systems. Adaptation of various communication parameters, such as data rate and power allocation, may be determined based on information obtained about the line and signal characteristics of the communication links.

In the embodiment illustrated in FIG. 1, a centralized communication adaptation unit 120 collects information about the signal and line characteristics for system communication links. Line characteristics may include features such as loop topology, transfer functions, and crosstalk coupling functions, for example. Signal characteristics may include features such as transmitted power spectral density, bandwidth utilized, modulation type, and bit allocation, among others. Use of this information allows the communications adaptation unit to perform centralized adjustment of communication parameters for all links.

The communication adaptation unit may access a constraint module 110 where constraints for the system and/or individual communication links, such as total power, power per link, etc, are stored. Line and signal characteristics for the links may be acquired by a line and signal characteristics module 130 and provided to the communication adaptation unit 120. The communication adaptation unit 120 may be an independent entity or may be incorporated as a component of one of the system users.

Figure 2:
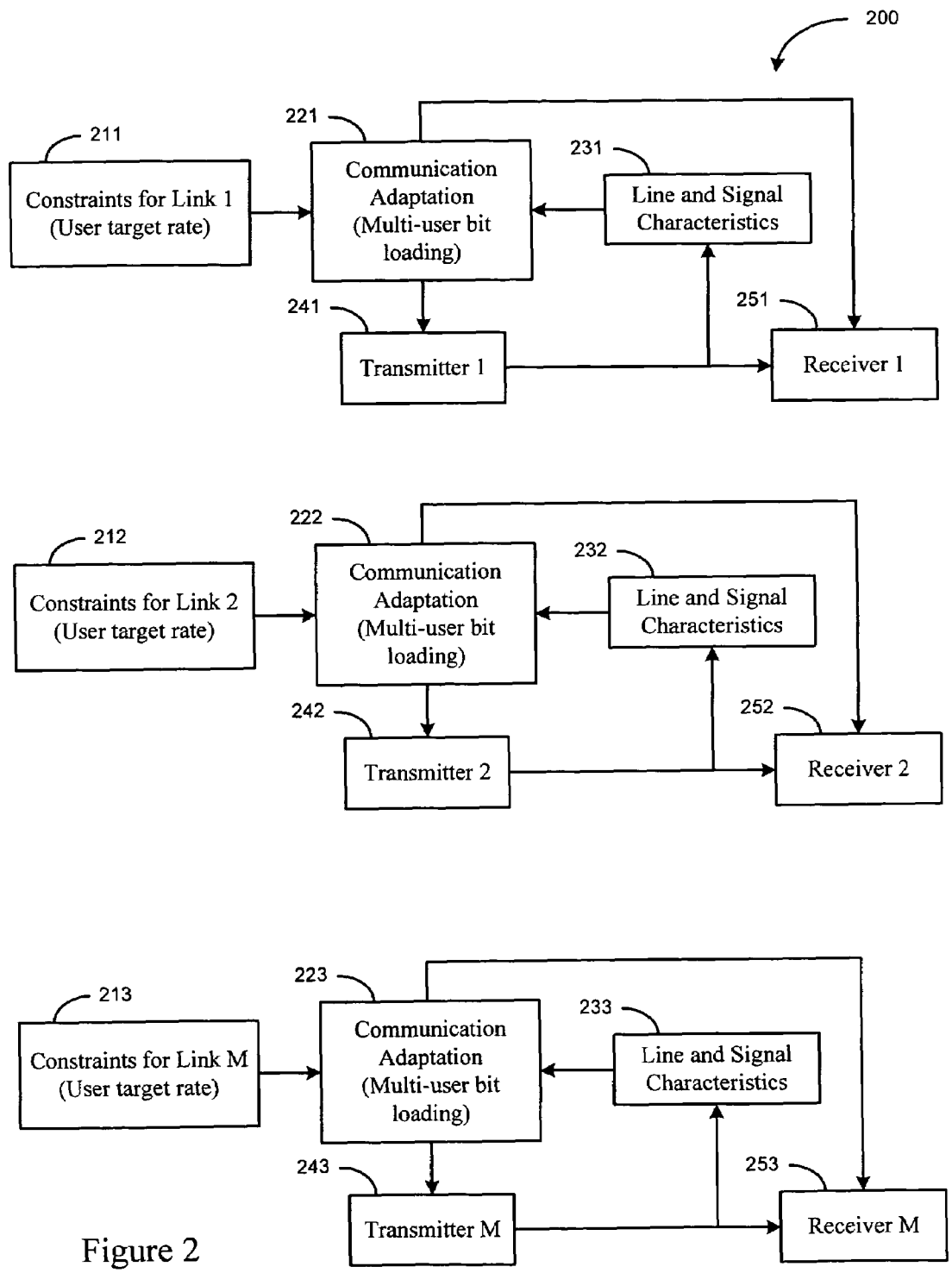
FIG. 2 is a block diagram of a communication system configured to implement distributed multi-user bit and power allocation methodologies in accordance with embodiments of the invention.

FIG. 2 is a block diagram of a system 200 in which communication parameter adjustment techniques in accordance with embodiments of the invention may be applied. The system 200 includes transceiver pairs 241, 251, 242, 252, 243, 253 connected by communications links. Requirements and constraints for each link are provided to a communication adaptation unit 221, 222, 223 for each link by a constraints module 211, 212, 213. In some cases, the line and signal characteristics of the communication link may be determined by a characteristics module 231, 232, 233 and provided to the communication adaptation unit 221, 222, 223. The line and signal characteristics may be used in the adjustment of communication parameters as described in more detail below.

In this embodiment, as illustrated in FIG. 2, there is no centralized communication adaptation unit and no communication or transfer of line and/or signal characteristics outside of a transceiver pair. Communication parameter adaptation is performed for each link using a distributed approach without centralized coordination.

One of the challenges of multi-user communication systems, such as DSL communication systems, is power control to effectively reduce crosstalk between user signals. In a DSL system, a number of links may be bundled together in a single binder. The proximity of the cables causes the electromagnetic field generated by one transmission signal to induce crosstalk in neighboring lines. The power of one user's transmission affects the interference experienced by other users. Thus, each user's performance depends not only on its power allocation, but also on the power allocation of all other users. Effective operation of the communication system involves performance trade-offs among users.

Figure 3:
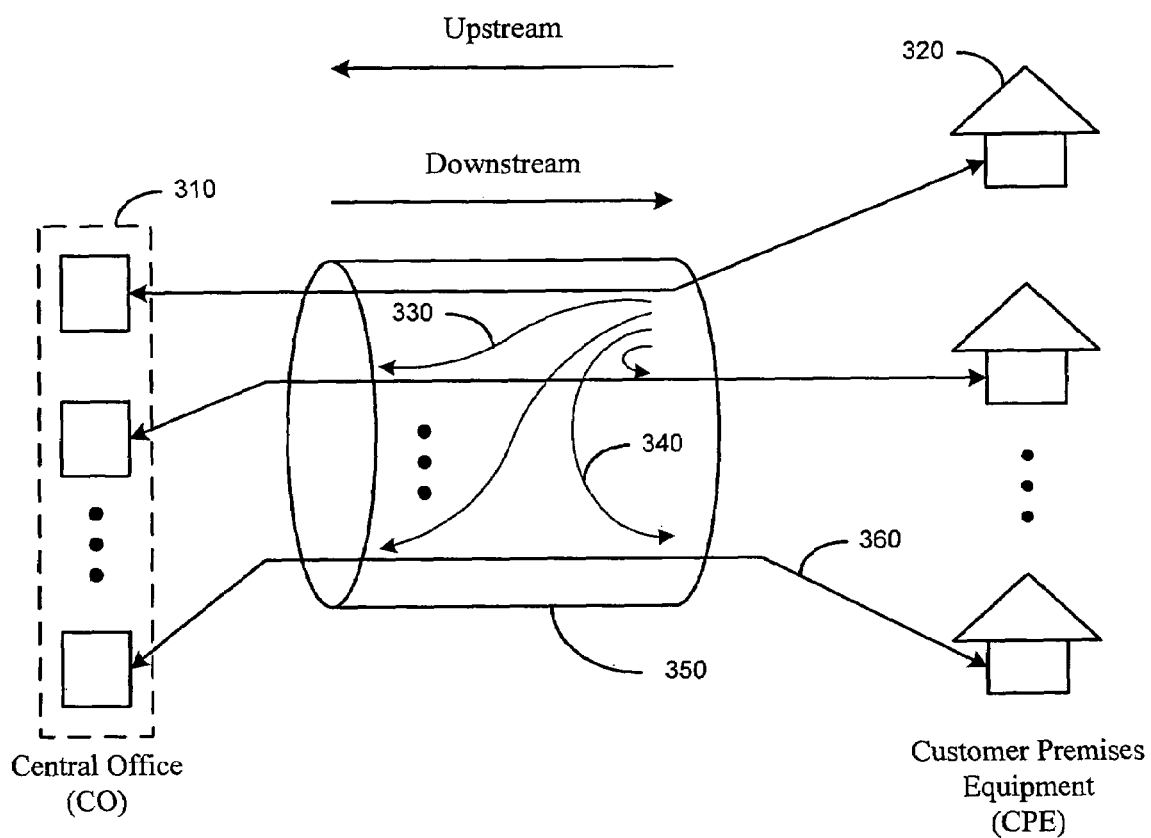
FIG. 3 is a diagram illustrating an example of a telephone system used for DSL service in connection with multi-user bit and power allocation in accordance with embodiments of the invention.

FIG. 3 is a diagram illustrating one example of a telephone system for DSL service. Twisted pairs emanating from customer premises equipment (CPE) 320 are grouped into one or more binders 350 that converge on a central office (CO) 310. The DSL bundle may include a number of subscriber lines, e.g., about 50 subscriber lines. Due to the close proximity of the subscriber lines electromagnetic fields produced by each of the subscriber lines may produce crosstalk interference in other lines. Near end crosstalk (NEXT) 340 is crosstalk induced by transmitters located at the same side of the transceiver. Far end crosstalk (FEXT) 330 is induced by transmitters located at the opposite end of the transceiver. NEXT is typically much larger than FEXT.

Figure 4:
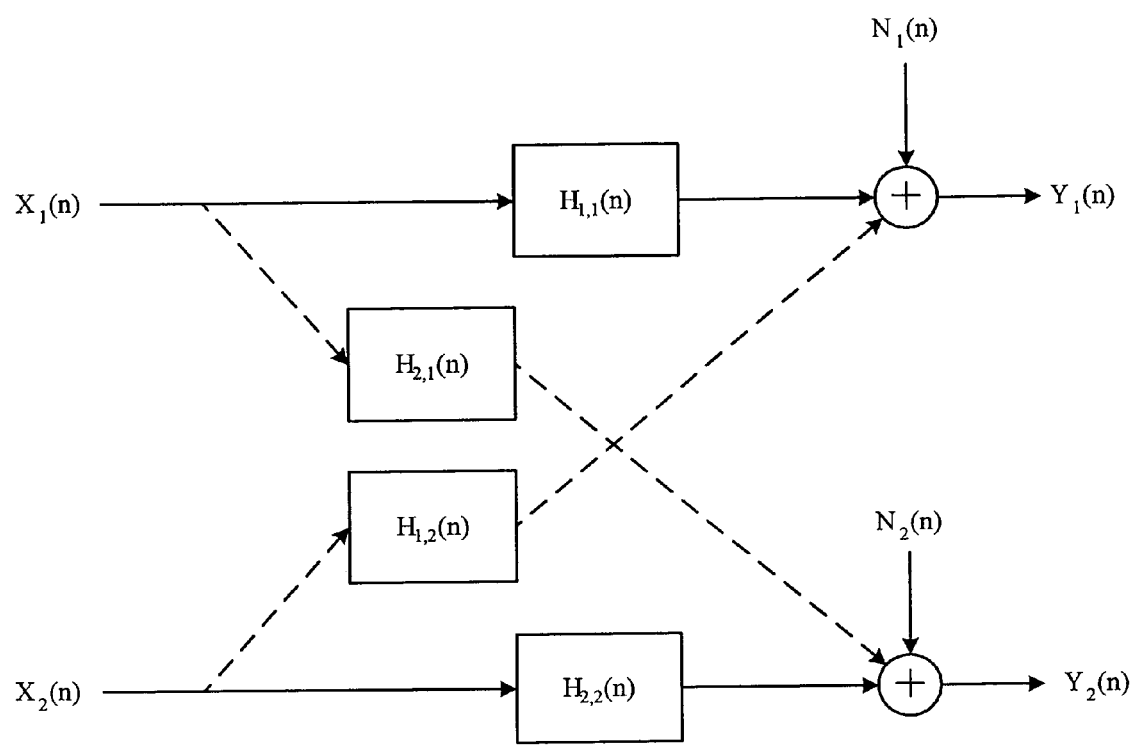
FIG. 4 is a diagram illustrating the channel model of subchannel n with $H_{i,i}(n)$ representing the direct channel gain of user i in subchannel n and $H_{i,j}(n)$ for i≠j the crosstalk gain from user j to user i used in the multi-user bit and power allocation method in accordance with embodiments of the invention.

A DSL channel can be represented as N independent subchannels, each of which is an interference channel of M users. FIG. 4 illustrates the channel model of subchannel n with $H_{i,i}(n)$ representing the direct channel gain of user i in subchannel n and $H_{i,j}(n)$ representing the crosstalk gain from user j to user i.

The signal-to-interference-plus-noise ratio (SINR) of user i in subchannel n may be expressed as:

$$S_i(n) = \frac{H_{i,j}^2(n) P_i(n)}{N_i(n) + \sum_{i=1}^{M} H_{i,j}^2(n) P_j(n)}, \quad (1)$$

where $H_{i,i}(n)$ represents the direct channel gain of user i in subchannel n, $H_{i,j}(n)$ represents the crosstalk channel gain from user j to user i, $P_i(n)$ and $N_i(n)$ represent the signal power and the background noise power of user i in subchannel n, respectively.

The SINR requirement for a rate allocation for M users, $(b_1(n), b_2(n), \ldots b_M(n))$ can be represented as:

$$\frac{H_{i,j}^2(n) P_i(n)}{N_i(n) + \sum_{i=1, i \neq j}^{M} H_{i,j}^2(n) P_j(n)} \geq \Gamma(2^{b_i(n)} - 1)(i = 1, 2, \ldots M), \quad (2)$$

where Γ is the signal to noise ratio (SNR) gap.

As previously discussed, when the level of crosstalk is high, the power allocation of one user changes the noise experienced by other users in the same binder. In this scenario, the performance of the communication system may be improved by jointly considering the bit and power allocations of all users. In accordance with methodologies employed by embodiments of the invention, performance of the communication system is improved by reducing the system power to achieve a target rate-sum. In this scenario, the power may represent the total power of the system for all users. The target rate-sum represents the sum of the bit rates of all users over subchannels of the communication system.

Reduction of power for a target rate sum may be expressed mathematically as follows:

Reduce $$\sum_{m=1}^{M} \sum_{n=1}^{N} P_i(n) \quad (3)$$

subject to $$\sum_{m=1}^{M} \sum_{n=1}^{N} b_i(n) \geq b_{t \text{ arg } et} \quad (4)$$

for n subchannels n=1, 2, . . . N, and M users i=1, 2 . . . M. The bit rates are discrete rates restricted to multiples of a base unit, e.g, 1, so that $$b_j(n) \in \{0,1,2,\ldots\}. \quad (5)$$

The minimum power required for the rate allocation $b_1(n), b_2(n), \ldots b_M(n)$ may be expressed as:

$$\begin{bmatrix} P_1(n) \\ P_2(n) \\ \vdots \\ P_M(n) \end{bmatrix} = \begin{bmatrix} \frac{|H_{11}(n)|^2}{\Gamma(2^{b_1(n)} - 1)} & -|H_{12}(n)|^2 & \cdots & -|H_{12}(n)|^2 \\ -|H_{21}(n)|^2 & \frac{|H_{22}(n)|^2}{\Gamma(2^{b_2(n)} - 1)} & \cdots & -|H_{2M}(n)|^2 \\ \vdots & \vdots & \ddots & \vdots \\ -|H_{M1}(n)|^2 & -|H_{M2}(n)|^2 & \cdots & \frac{|H_{MM}(n)|^2}{\Gamma(2^{b_M(n)} - 1)} \end{bmatrix}^{-1} \begin{bmatrix} N_1(n) \\ N_2(n) \\ \vdots \\ N_M(n) \end{bmatrix}, \quad (6)$$

which is the Pareto optimal solution. In accordance with techniques exemplified by the embodiments described herein, the target rate may be allocated among subchannels and/or users to reduce the power sum, thus reducing noise affecting users of the communication system.

Figure 5:
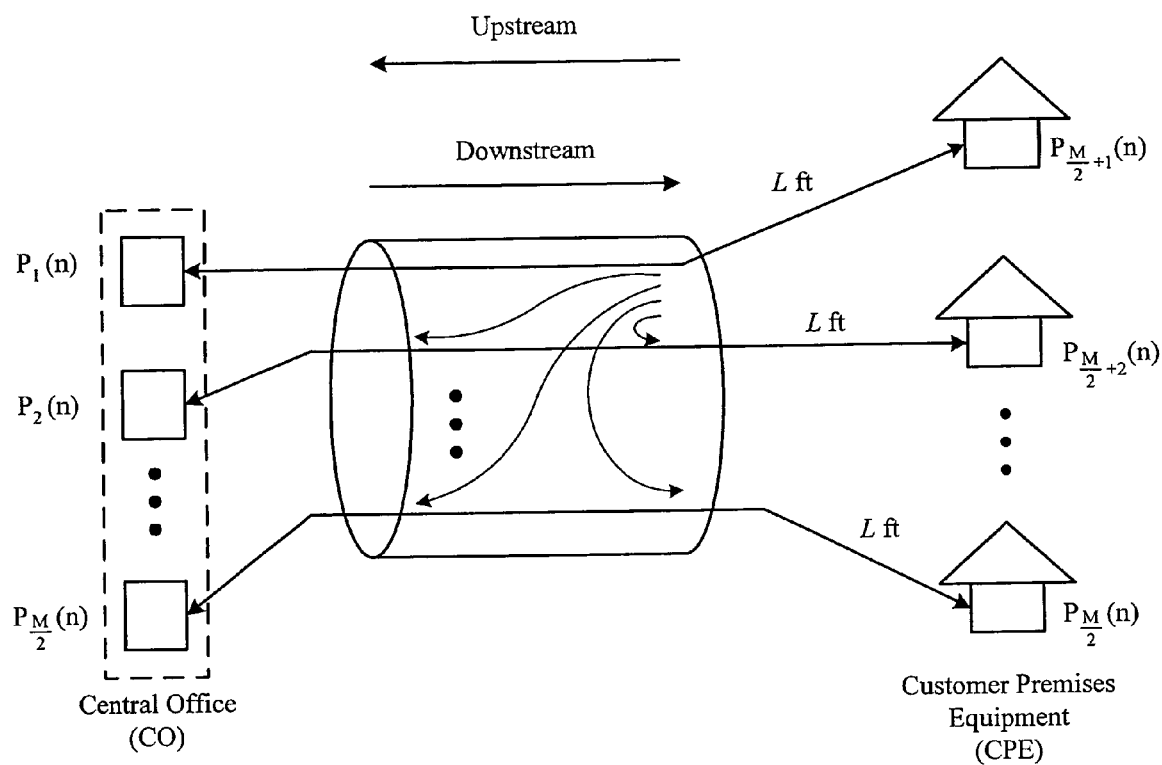
FIG. 5 is a diagram illustrating a DSL system of equal length loops for which a multi-user bit and power allocation procedure is implemented in accordance with embodiments of the invention.

One embodiment of the invention involves determining a power allocation for both upstream and downstream signals when both directions are allowed to use the entire frequency band. In this embodiment, the communication system is represented by DSL loops of equal length, as illustrated in FIG. 5. The channel may be approximated as symmetric, and the channel gains of one user are substantially the same as other users. The transmit power spectral densities (PSDs) in the same transmit direction may be taken as about equal. Because the FEXT channel gain is much smaller than the direct channel gain in equal length loops, this does not significantly degrade performance of the techniques described.

As illustrated in FIG. 5, the channel is utilized for both upstream and downstream communications, wherein the power of the downstream users is represented by $P_1(n)$, $P_2(n)$, ...

$$P_{\frac{M}{2}}(n)$$

and the power of the upstream users is represented by $$P_{\frac{M}{2}+1}(n), P_{\frac{M}{2}+2}(n), \ldots, P_M(n).$$

In this situation, reduction of power-sum for a target rate sum may be expressed as follows:
Reduce $$\sum_{m=1}^{M} P_{u,m} + \sum_{m=1}^{M} P_{d,m}$$

subject to $$\sum_{m=1}^{M} b_{u,m} + \sum_{m=1}^{M} b_{d,m} \geq b_{target} \quad (7)$$

where $P_u(n)$ and $P_d(n)$ are the powers of upstream and downstream in subchannel n, respectively and $b_u(n)$, and $b_d(n)$ are data rates of upstream and downstream in subchannel n, respectively. This presents a two-dimensional allocation problem to distribute the target rate $b_{target}$ the subchannels and to the streams.

Figure 6A:
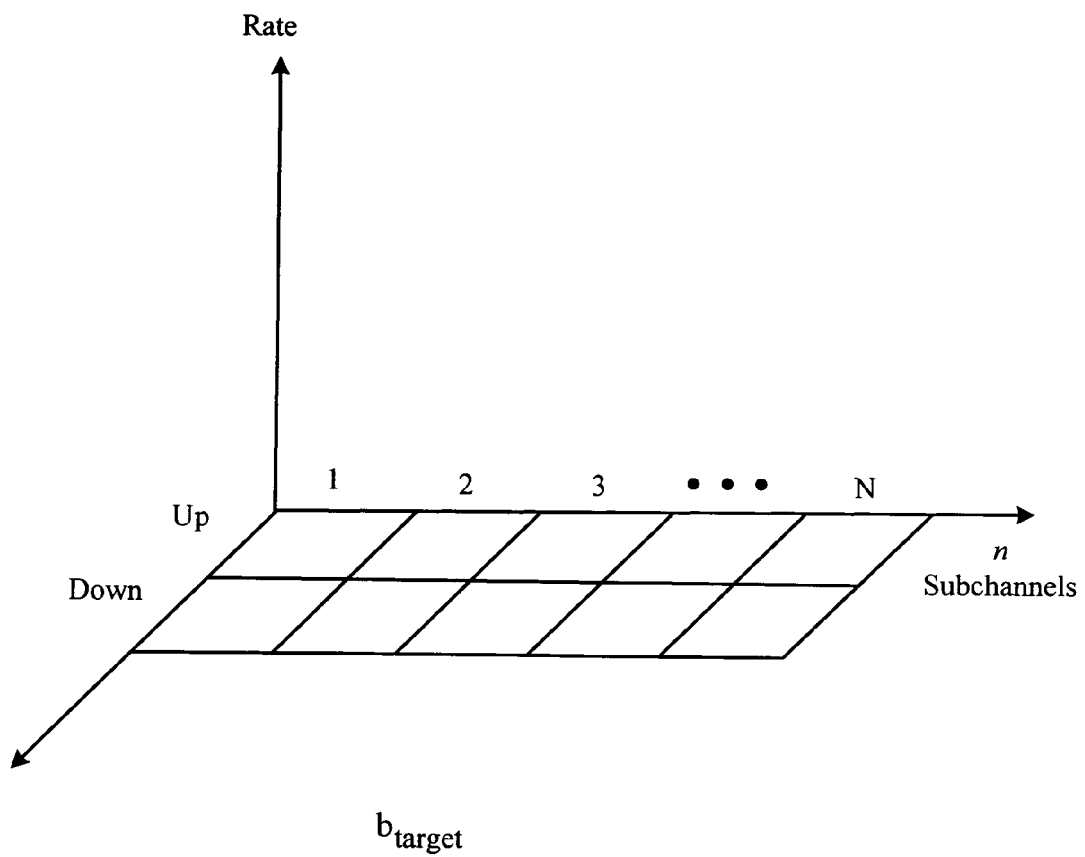
FIGS. 6a-d are graphs illustrating a two dimensional allocation technique over subchannels and streams in accordance with embodiments of the invention.
Figure 6B:
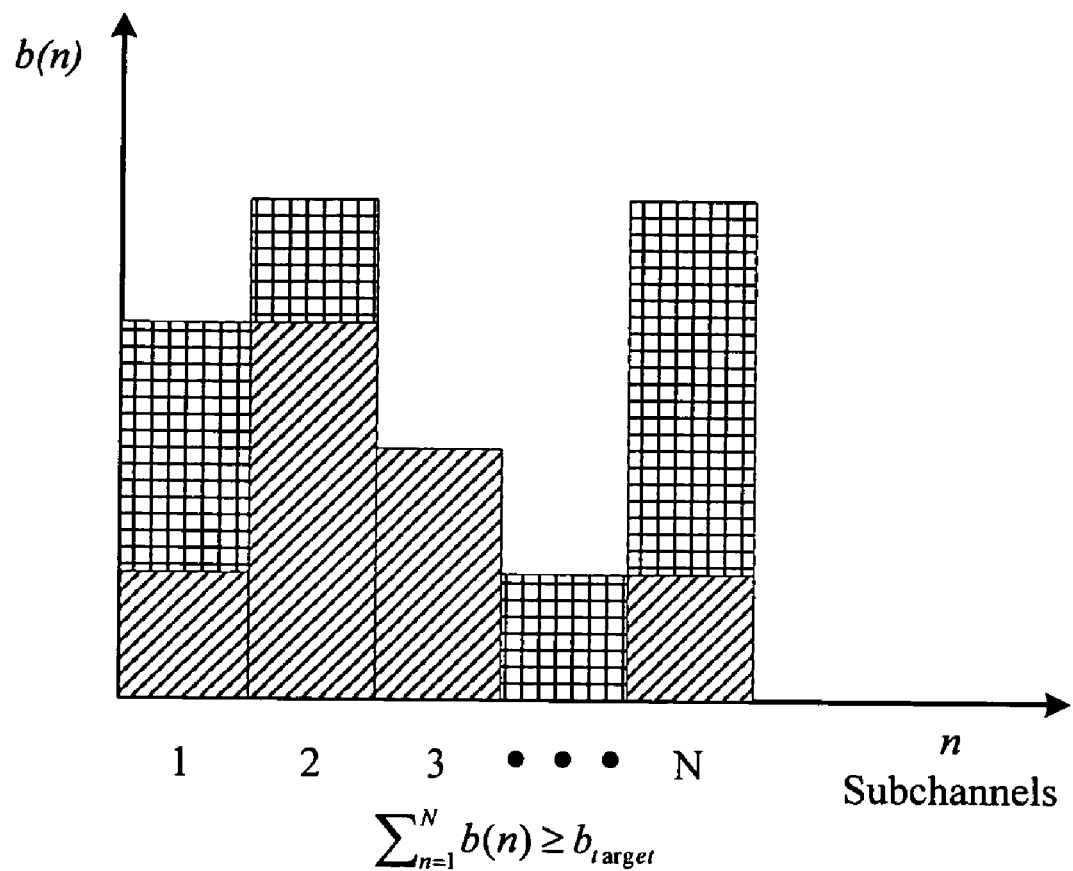
Figure 6C:
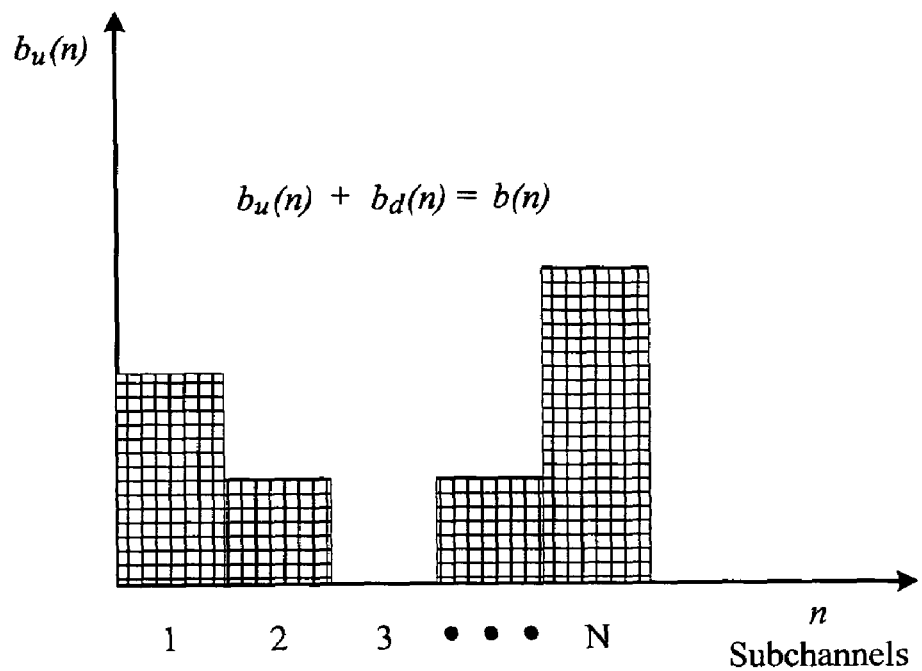
Figure 6D:
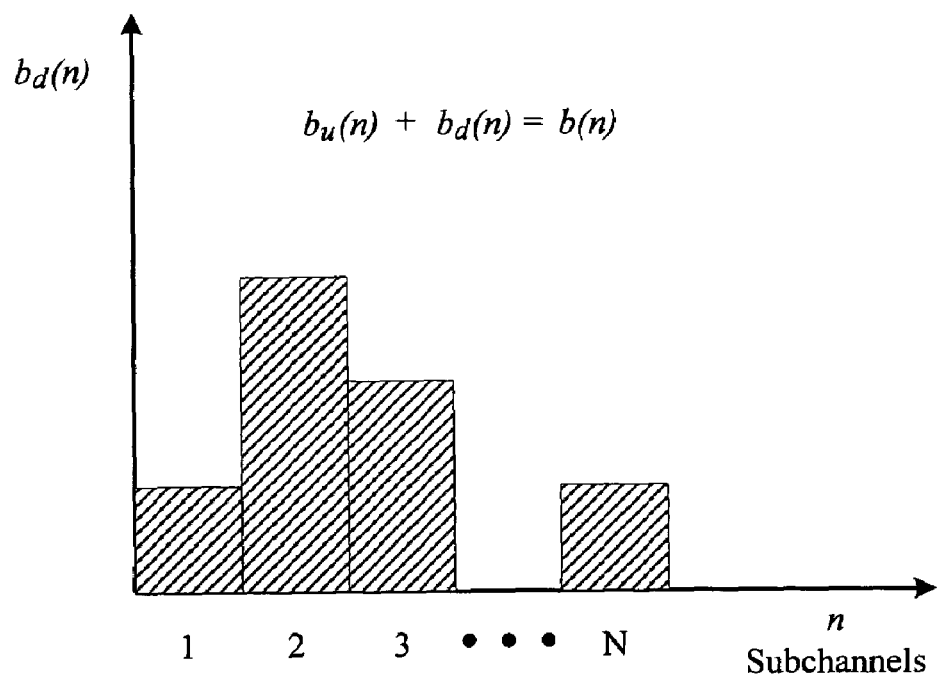

The graphs of FIGS. 6a-d illustrate the two dimensional allocation presented in Equation 7. The target rate, $b_{target}$, is allocated over subchannels n and up and downstreams as indicated in FIG. 6a. According to this procedure, $b_{target}$ is allocated over subchannels 1-N as illustrated in FIG. 6b, using the algorithm discussed below. The rate allocated to each subchannel n is distributed to upstream (FIG. 6c) and downstream (FIG. 6d).

Reduce $P_{u,m} + P_{d,m}$ subject to $b_{u,m} + b_{d,m} = b_m$ (8)

where $P_{u,m}$ is power of the upstream, $P_{d,m}$ is the power of the downstream, and $b_{u,m}$ is the upstream bit rate, $b_{d,m}$ is the downstream bit rate, and $b_m$ is the target rate sum for the subchannel.

For the continuous rate case, the Pareto optimal solution is:

$$\begin{bmatrix} P_{u,m} \\ P_{d,m} \end{bmatrix} = \frac{N_m}{H_m} A_m^{-1} \begin{bmatrix} 2^{b_{u,m}} - 1 \\ 2^{b_{d,m}} - 1 \end{bmatrix}, \quad (9)$$

where $$A_m = \begin{bmatrix} 1 - \alpha_m \frac{2^{b_{u,m}} - 1}{H_m} & -\beta_m \frac{2^{b_{u,m}} - 1}{H_m} \\ -\beta_m \frac{2^{b_{d,m}} - 1}{H_m} & 1 - \alpha_m \frac{2^{b_{d,m}} - 1}{H_m} \end{bmatrix},$$

The power-sum of Equation 7 may be reduced by the following power allocation:

$$\beta_m \leq \sqrt{\alpha_m(\alpha_m + H_m)}, (b_{u,m}, b_{d,m}) = \left(\frac{b_m}{2}, \frac{b_m}{2}\right) \quad (10)$$

$$\beta_m > \alpha_m + \frac{H_m}{2}, (b_{u,m}, b_{d,m}) = (b_m, 0), (0, b_m) \quad (11)$$

$$iii. \sqrt{\alpha_m(\alpha_m + H_m)} < \beta_m \leq \alpha_m + \frac{H_m}{2} \quad (12)$$

$$(b_{u,m}, b_{d,m}) = \begin{cases} b_m/2, b_m/2 & \text{if } b_m < b_m, th \\ (b_m, 0), (b_m, 0) & \text{otherwise} \end{cases}, \quad (13)$$

where $$b_m, th = 2\log_2\left(\frac{H_m + \alpha_m - \beta_m}{\beta_m - \alpha_m}\right)$$

For the discrete rate case, Equation 13 becomes:

$$\left(\left\lceil \frac{b_m}{2} \right\rceil, \left\lfloor \frac{b_m}{2} \right\rfloor\right), \text{ or } \left(\left\lfloor \frac{b_m}{2} \right\rfloor, \left\lceil \frac{b_m}{2} \right\rceil\right) \quad (14)$$

The bit allocation over streams may be determined by Equation 14 for the discrete rate case. The bit allocation over subchannels may be determined using a greedy algorithm. A greedy algorithm assigns bits to subchannels one bit at a time. For each assignment, the subchannel that requires the least amount of energy is selected.

The bit allocation technique is proceeds as follows:
1) Initialization:
For all subchannels, calculate the cost to transmit one bit.
2) Bit-loading Iterations:
Repeat the following until the target-rate $b_{target}$ is achieved:
a) Increase one bit in subchannel m, where adding one bit requires the minimum cost among all available subchannels.
b) Update the cost to increase one bit in subchannel m.

The cost to increase one bit in subchannel M may be expressed as:

$$\Delta c_m(b_m) = \begin{cases} c_m(b_m) - c_m(b_m - 1), & \text{if } b_m \geq 1 \\ c_m(b_m), & \text{if } b_m = 0 \end{cases} \quad (15)$$

where $c_m(b_m)$ is the minimum power-sum to transmit $b_m$ bits in subchannel m. The power sum $c_m(b_m)$ can be calculated by comparing the powers of two bit distributions, $$(b_{u,m}, b_{d,m}) = \left( \left\lceil \frac{b_m}{2} \right\rceil, \left\lfloor \frac{b_m}{2} \right\rfloor \right)$$

and $(b_m, 0)$, since $$(b_{u,m}, b_{d,m}) = \left( \left\lfloor \frac{b_m}{2} \right\rfloor, \left\lceil \frac{b_m}{2} \right\rceil \right)$$

and $(0, b_m)$ produce the same $c_m(b_m)$ with $$(b_{u,m}, b_{d,m}) = \left( \left\lceil \frac{b_m}{2} \right\rceil, \left\lfloor \frac{b_m}{2} \right\rfloor \right)$$

and $(b_m, 0)$. Suppose $p_m(b_m)$ and $q_m(b_m)$ are the minimum power necessary for $(b_{u,m}, b_{d,m}) = (b_m, 0)$ and $$(b_{u,m}, b_{d,m}) = \left( \left\lceil \frac{b_m}{2} \right\rceil, \left\lfloor \frac{b_m}{2} \right\rfloor \right),$$

respectively. Then, by the Pareto optimal solution (Equation 9), $$p_m(b_m) = \begin{cases} \dfrac{N_m(2^{b_m} - 1)}{H_m - \alpha(2^{b_m} - 1)} & \text{if } bm < \log_2\left(1 + \dfrac{H_m}{\alpha_m}\right) \\ \infty & \text{otherwise} \end{cases} \quad (16)$$

$$q_m(2b_m) = \begin{cases} \dfrac{2N_m(2^{b_m} - 1)}{H_m - (\alpha_m + \beta_m)(2^{b_m} - 1)} & \text{if } bm < \log_2\left(1 + \dfrac{H_m}{\alpha_m}\right) \\ \infty & \text{otherwise} \end{cases} \quad (17)$$

The expression for $q_m(2b_m+1)$ is complex, but can be determined using Equation 8. The power-sum $c_m(b_m)$ then takes the form of pm(bm) or qm(bm) depending on $H_m, \alpha_m, \beta_m$, and $b_m$ as follows:

i. $\beta_m \leq \sqrt{\alpha_m(\alpha_m + H_m)}, c_m(b_m) = q_m(b_m)$ (18)

ii.

$$\beta_m > \alpha_m + \frac{H_m}{2}, c_m(b_m) = p_m(b_m) \quad (19)$$

iii.

$$\sqrt{\alpha_m(\alpha_m + H_m)} < \beta_m \leq \alpha_m + \frac{H_m}{2} \quad (20)$$

$$c_m(b_m) = \begin{cases} q_m(b_m) \\ p_m(b_m) \end{cases} \text{if } b_m < b_{m,\,th} \quad (21)$$

Although the proposed technique determines whether a subchannel should be shared or not, it does not determine whether a subchannel not shared should be allocated to upstream or downstream. However, unshared subchannels can be used as either upstream or downstream without any difference in the data rates or power. Thus, whether each unshared subchannel should be assigned to the upstream or downstream can be determined by the power and rate requirement of each stream.

Figure 7:
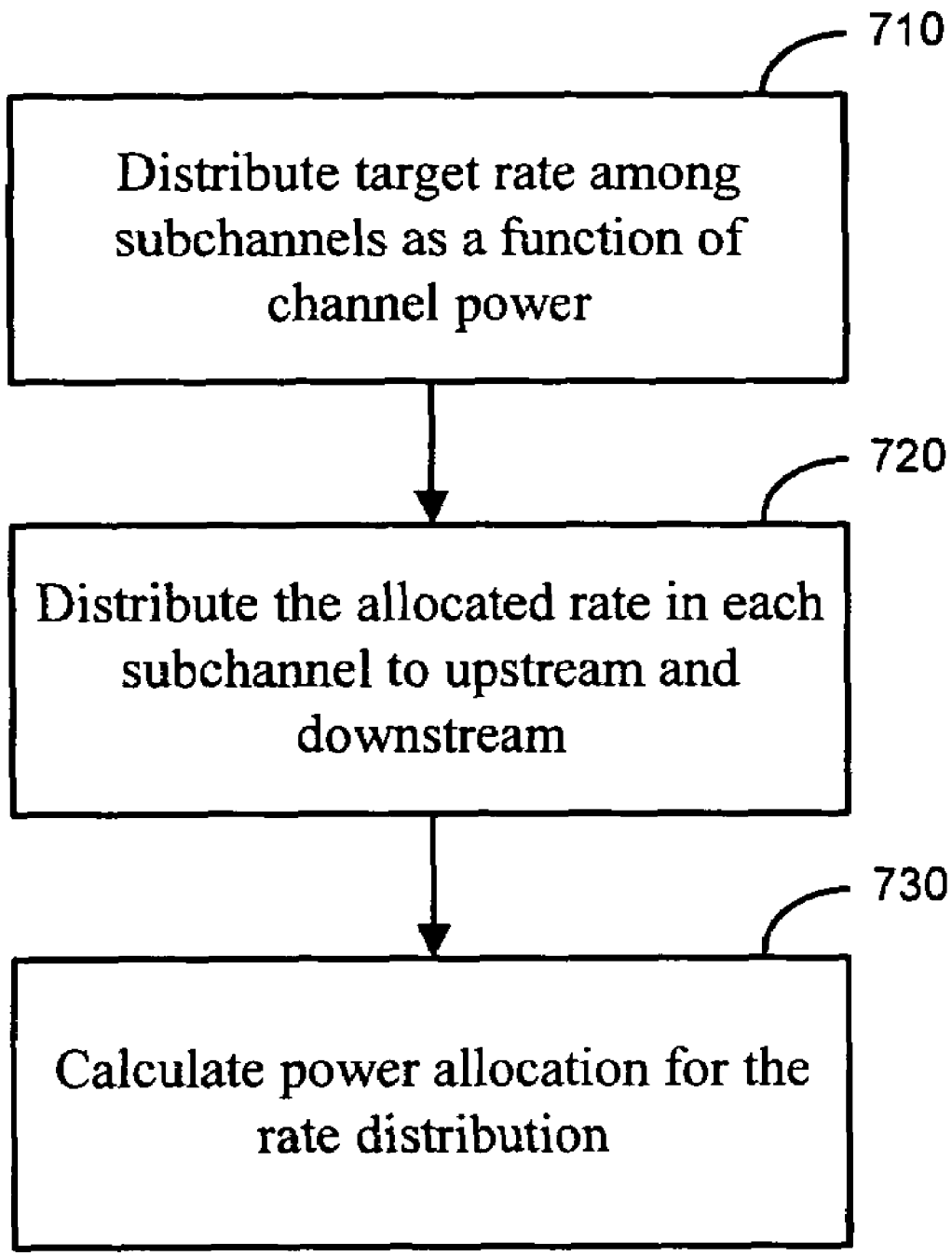
FIGS. 7 and 8 are flowcharts illustrating methods of rate and power allocation over subchannels and streams in accordance with embodiments of the invention.

FIG. 7 is a flowchart illustrating a method of power and bit-rate allocation in accordance with embodiments of the invention. The method involves allocating 710 a target rate sum to subchannels, e.g., using the greedy algorithm discussed above. The allocated rate in each subchannel is distributed 720 to the upstream and downstream of the subchannel. The power for the rate distribution as allocated is determined 730.

Figure 8:
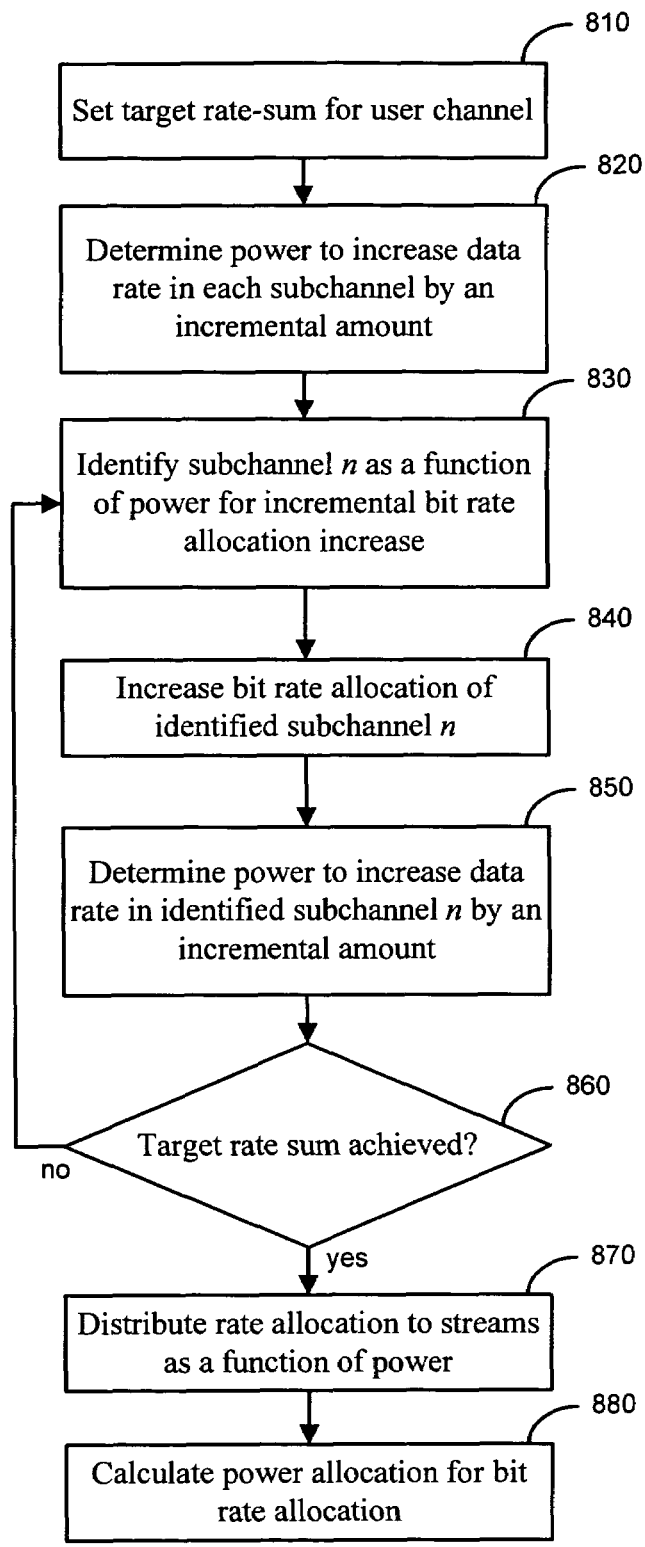

FIG. 8 is a more detailed flowchart illustrating the operation of the bit rate and power allocation in accordance with an embodiment. An initialization process involves establishing 810 a target rate-sum for a user channel and determining 820 the power to increase the data rate an incremental amount in each subchannel. For each subchannel n, the power to increase the data rate by an incremental amount, e.g., one bit, is determined.

When a bit is added to a particular subchannel, a corresponding increase occurs in the power required by the subchannel. In addition, because the increase in data rate of the subchannel generates interference in the other subchannels, the power of the other subchannels must increase to maintain the SINRs of the other subchannels. The power to increase the data rate by an incremental amount in one subchannel may alternatively be expressed in terms of cost. When the bit rate in a subchannel is increased, the total cost includes the additional cost of adding a bit to the subchannel and the cost to other subchannels to maintain their SINRs in light of the additional bit.

A subchannel n is identified 830 as a function of power (i.e., cost) required to increase the bit rate of subchannel n. In a preferred embodiment, a subchannel n may be identified as a function of power required to increase the bit rate of the subchannel n by one bit. The power involves not only the power required in increment the bit rate of subchannel n, but also the power required by other subchannels due to the increased bit rate of subchannel n. The data rate is increased 840 in the identified subchannel by one bit. The power to increase the data rate in the identified subchannel is recalculated 850 in light of the increased data rate.

The process 830-850 of iteratively identifying a subchannel associated with the lowest cost to increase the bit rate, increasing the bit rate in the identified subchannel and recalculating the power associated with increasing the data rate in the identified subchannel continues until the target rate-sum has been allocated 860 across the subchannels.

If the target rate-sum is allocated 860 across subchannels, the subchannel bit rate allocation may be distributed 870 to the upstream and downstream directions as a function of power required for the distribution. The power allocation to support the bit rate allocation is determined 880.

System performance of a multi-user, multi-carrier communication system may be enhanced by reducing the power required to implement a target rate-sum across users and subchannels of the system. This goal is mathematically expressed in Equations 3-4 above. The single user greedy algorithm approach described previously iteratively increases the bit rate in subchannels that require the least power to transmit the increased bit rate. A multi-user discrete bit-loading approach in accordance with an embodiment of the invention increases the bit rate of the user and subchannel as a function of power. In accordance with a preferred embodiment, a multi-user bit allocation method increases the bit rate of a user and subchannel requiring a minimum amount of power by one bit. As previously described, the cost to increase the bit rate is dependent on the cost to increase the bit rate in a user subchannel and the cost incurred by other users due to the increased bit rate.

Figure 9:
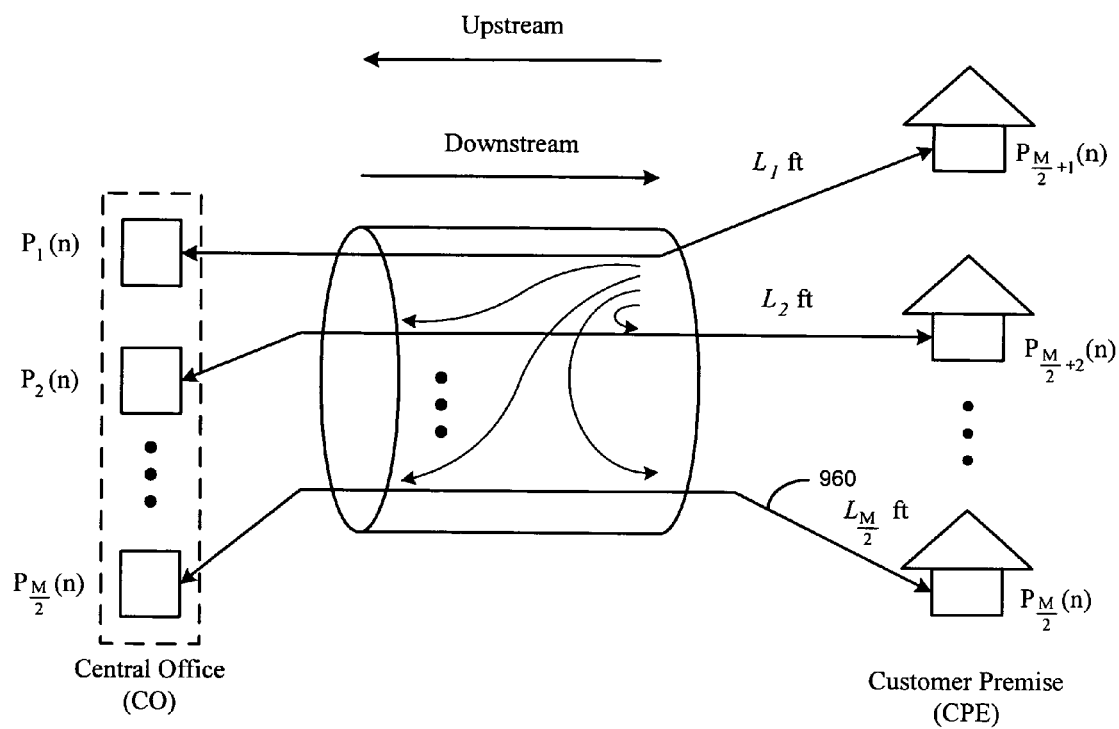
FIG. 9 is a diagram illustrating a DSL system of unequal length loops for which a multi-user bit and power allocation procedure is implemented in accordance with embodiments of the invention.

A general DSL communication system is represented by loops of unequal length, as illustrated in FIG. 9. In this scenario, unlike the equal loops case presented above, the channel may not be approximated as symmetric and transmit power spectral densities (PSDs) in the same transmit direction may not be taken as equal. As illustrated in FIG. 9, the channel is utilized for both upstream and downstream communications, wherein the power of the downstream users is represented by $P_1(n), P_2(n), \ldots$ $$P_{\frac{M}{2}}(n)$$

and the power of the upstream users is represented by $$P_{\frac{M}{2}+1}(n), P_{\frac{M}{2}+2}(n), \ldots, P_M(n).$$

Figure 10A:
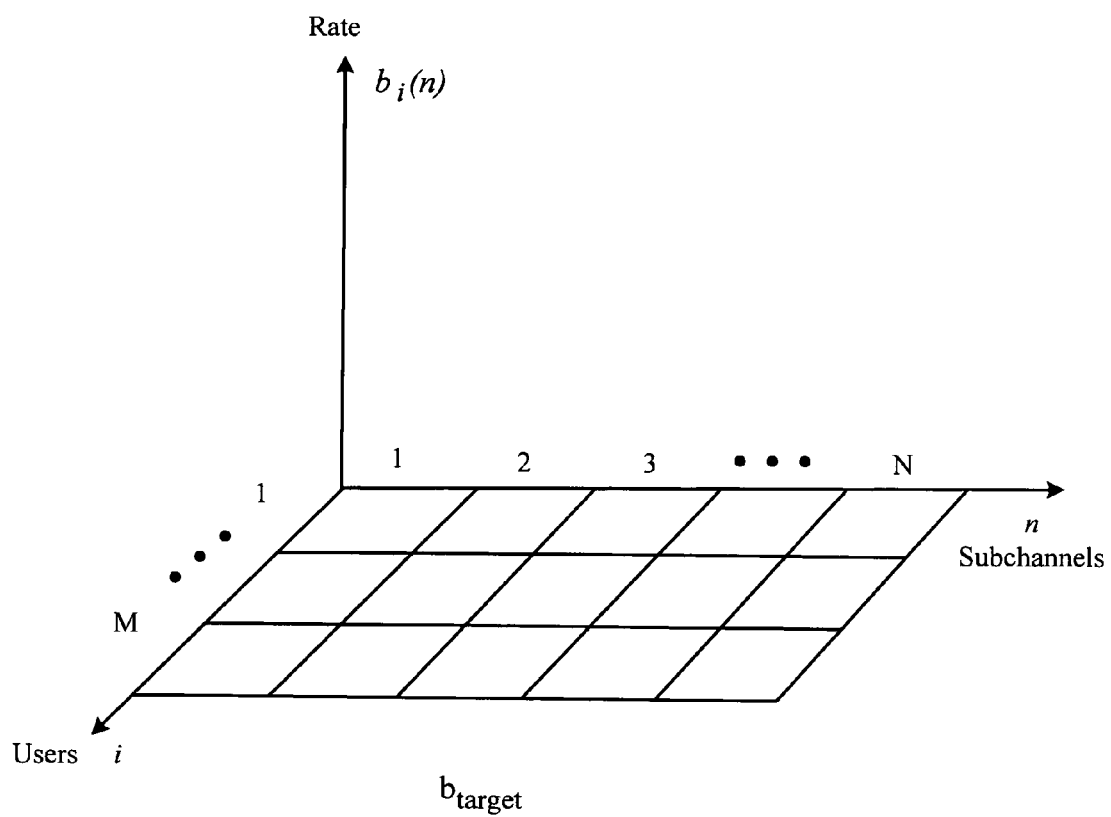
FIGS. 10a-e are graphs illustrating a two dimensional allocation technique over subchannels and users in accordance with embodiments of the invention.
Figure 10B:
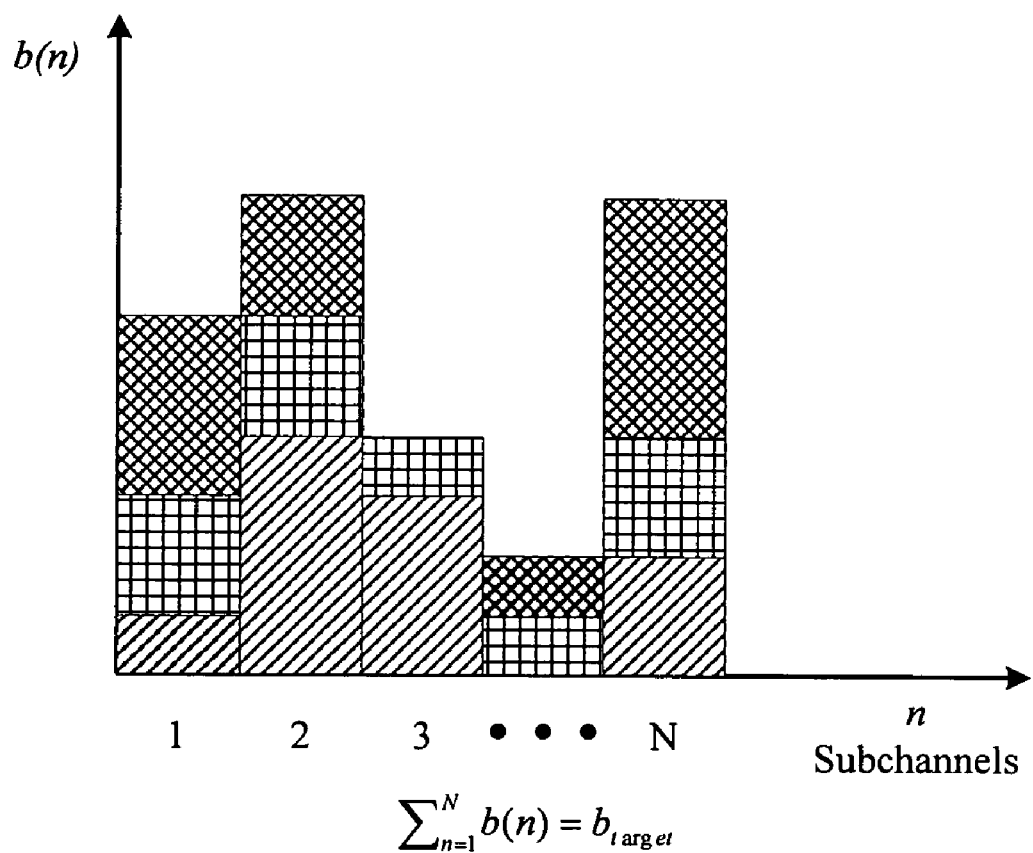
Figure 10C:
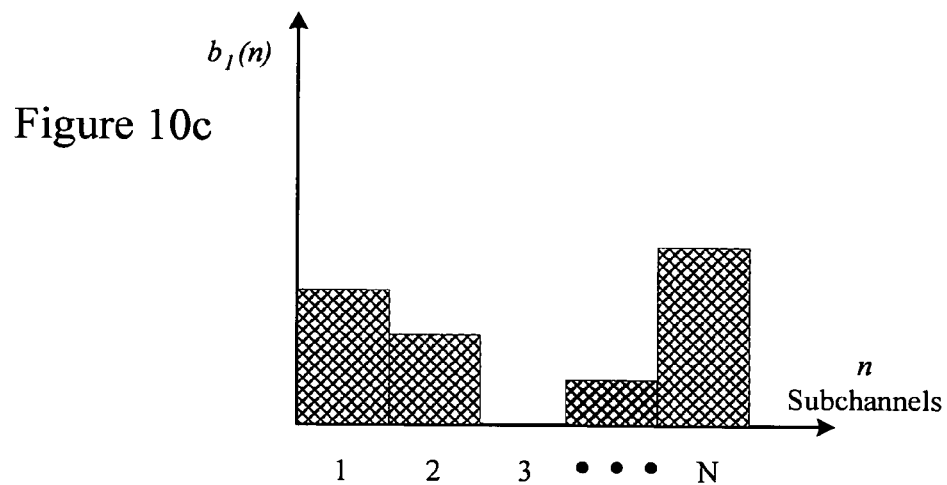
Figure 10D:
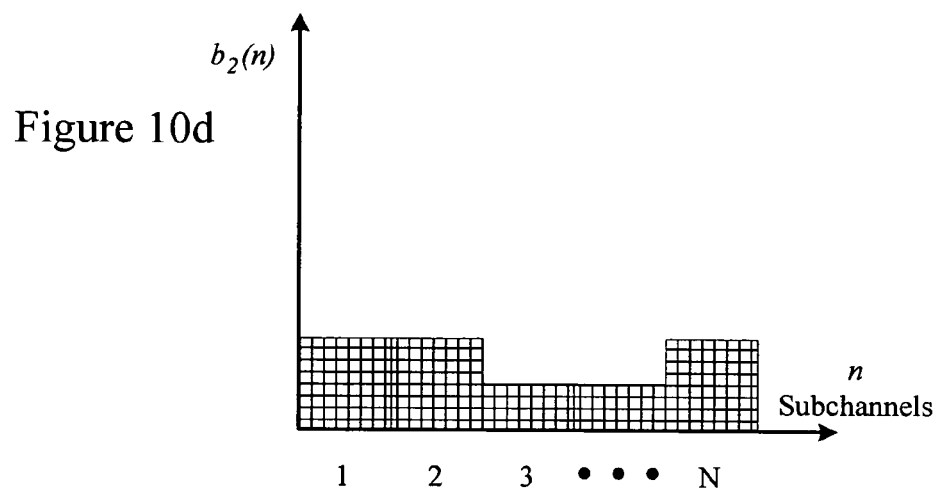
Figure 10E:
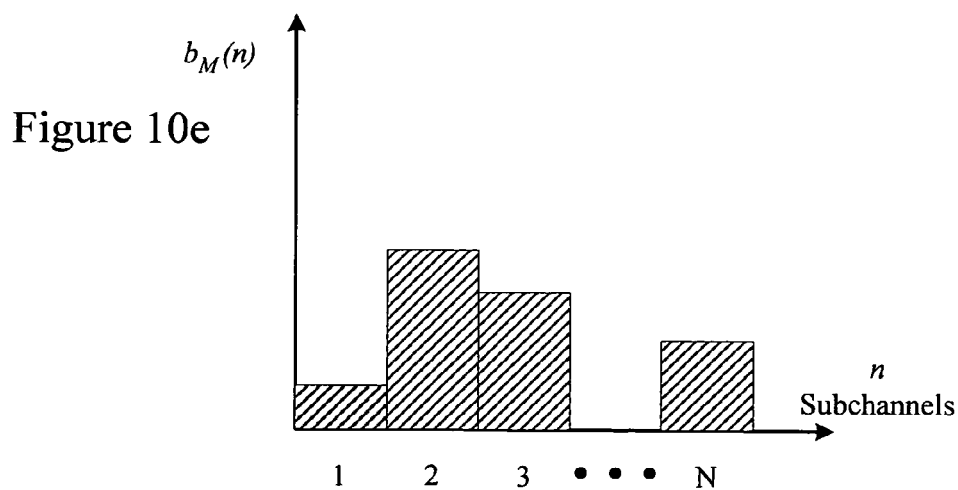

As illustrated in FIGS. 10a-d, a multi-user, multi-carrier power and rate allocation may be effected using a two dimensional approach. The target rate, $b_{target}$, is allocated over subchannels n for n=1 to N, and users i for i=1 to M as indicated in FIG. 10a. According to this procedure, $b_{target}$ is allocated over subchannels 1-N as illustrated in FIG. 10b, using the greedy algorithm discussed above. The rate allocated to each subchannel n is allocated to user 1 (FIG. 10c), user 2 (FIG. 10d), through M (FIG. 10e) using the greedy algorithm. The target bit rate may be allocated over up streams and down streams for each user channel.

In the multi-user case there is no closed-form solution, unlike the equal loops case described above. The greedy algorithm described above is used to distribute a target rate-sum in the user domain. The cost to add one bit to user i in subchannel n may be expressed:

$$C(n, i) = \sum_{j=1}^{M} \Delta P_j(n, i) \quad (22)$$

where $\Delta P_j(n,i)$ is the incremental power of user j required to add one bit to user i in subchannel n. The greedy algorithm is also used to distribute the user target rate to the subchannels. The Pareto optimal solution allows determination of the minimum power sum $P_\Sigma^*(n,b_n)$ for the bit allocation $b_n$.

Figure 11:
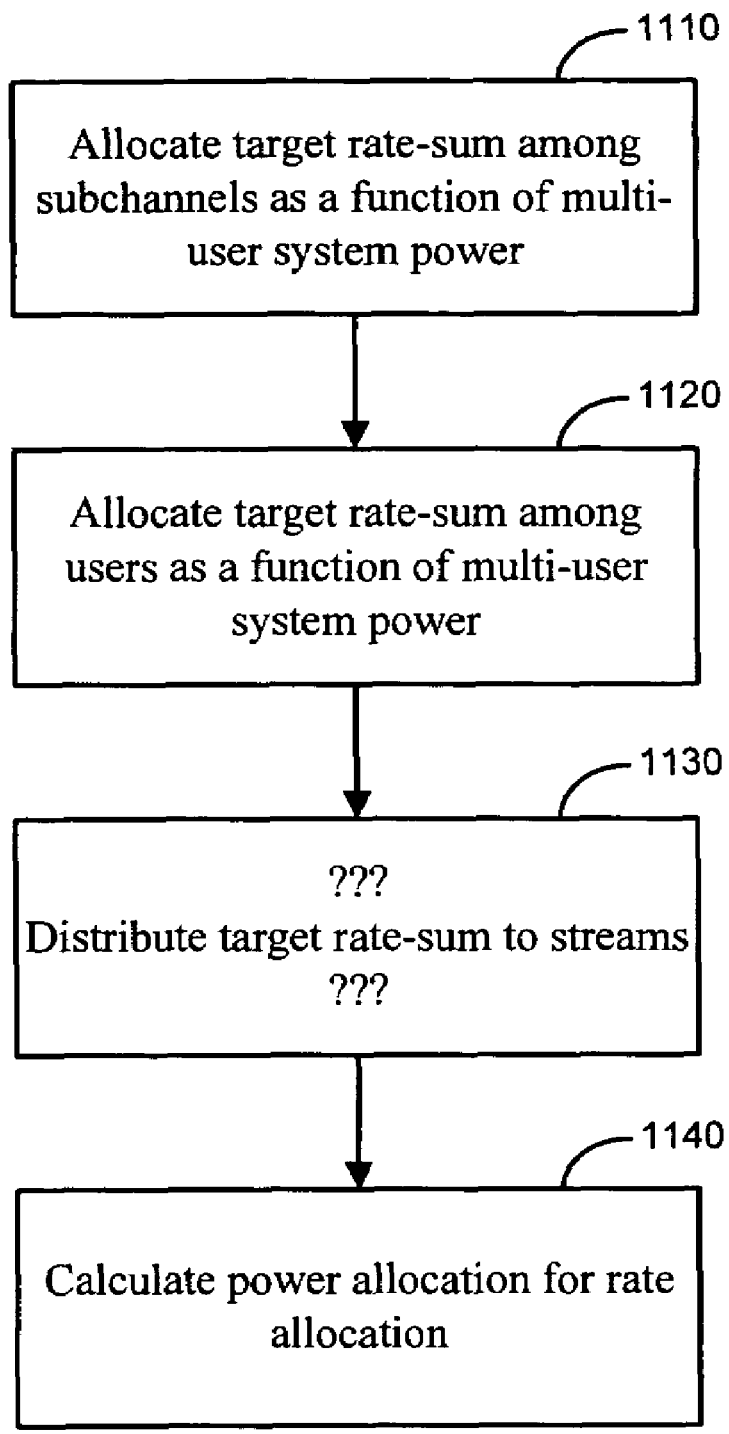
FIGS. 11 and 12 are flowcharts illustrating methods for rate and power allocation over subchannels and users in a multi-user, multi-carrier communications system in accordance with embodiments of the invention.

FIG. 11 is a flowchart illustrating a method for rate and power allocation in a multi-user, multi-carrier communication system in accordance with embodiments of the invention. A target rate-sum is allocated among users 1110 and subchannels 1120 as a function of power. The power allocated to each subchannel may be distributed 1130 between up and downstreams. The power allocation for the rate allocation is determined 1140, for example, using the Pareto optimal solution as provided in Equation 6.

Figure 12:
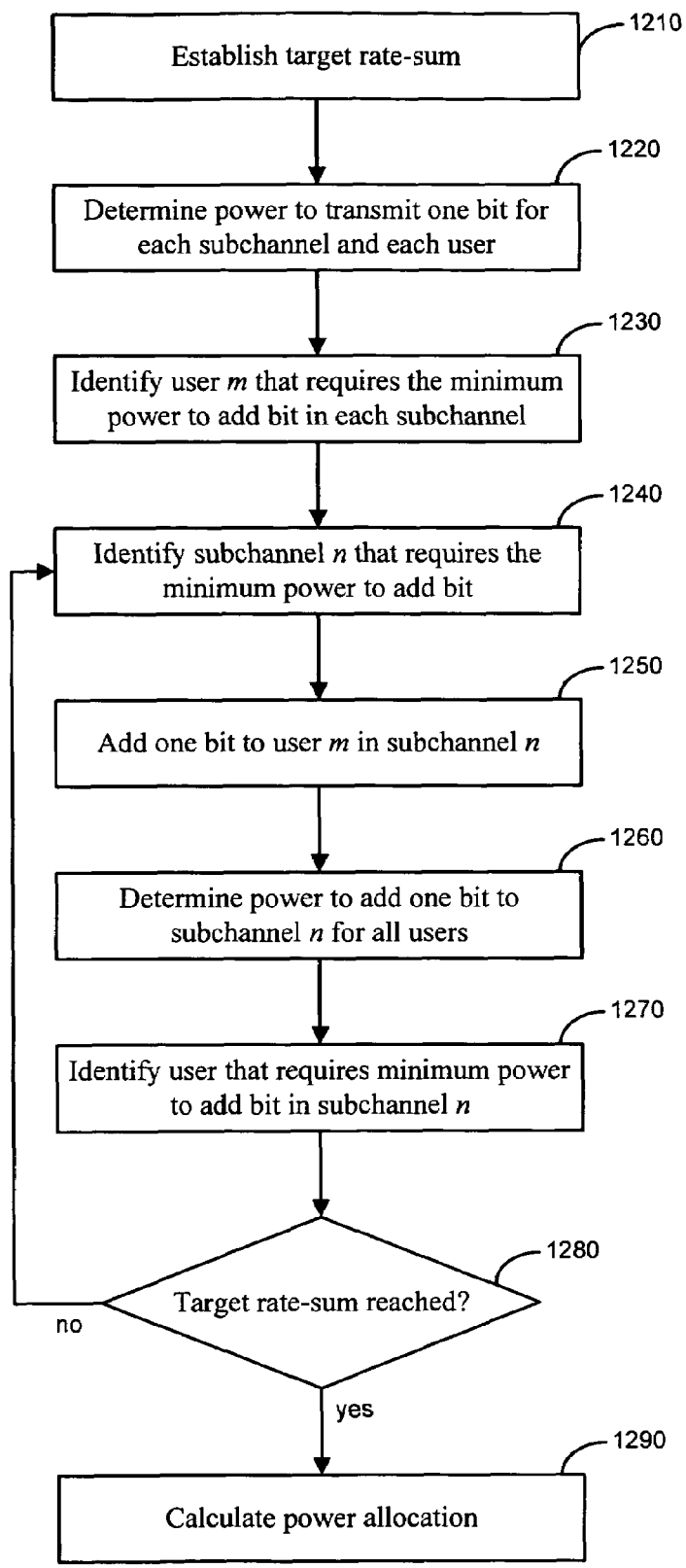

A more detailed flowchart of the process is illustrated in FIG. 12. A target rate sum for the system is established 1210. The power to transmit one bit is determined 1220 for each user and subchannel. Users that require the minimum power in each subchannel are identified 1230.

Bit loading iterations involve identifying 1240 a subchannel that requires the least amount of power to increase the bit rate by one bit. One bit is added to identified subchannel 1250. The power required to add another bit to the previously identified subchannel is updated 1260 for all users. The user that requires the least amount of power to increase the bit rate in the previously identified subchannel is identified 1270.

If the target rate sum has not been achieved 1280, the iterative bit loading process continues until the target rate sum is reached. Otherwise, the power allocation for the determined bit allocation is determined 1290.

The multi-user bit loading approach described above is optimal when each subchannel n has one of the following properties: There is no interference among users, i.e., $H_{ji}(n)=0$ for all i≠j, or the interference is strong, i.e., $|H_{ji}(n)| \geq |H_{ii}(n)|$ for all i and j. The previously described power and bit allocation techniques may be implemented using either a distributed or centralized approach. The centralized approach assumes the existence of a central entity, such as the communication adaptation unit illustrated in FIG. 1. The centralized entity may acquire knowledge of channel and crosstalk coupling functions, determine the desired signaling characteristics and parameters for each user, and instructs each user to use the determined transmission characteristics and parameters.

A distributed or uncoordinated approach does not require the centralized knowledge of the crosstalk coupling functions. In such an embodiment, the transceivers of each user enter a phase during which each user individually adjusts its own signaling characteristics in accordance with the power and bit allocation techniques previously described. In the distributed system, a centralized entity may not be present at all, or may be restricted to setting target performance levels, e.g., target bit rates, for the users.

Distributed determination of power and rate allocations are based on iterative greedy algorithms by individual users for convergence to an equilibrium which may not be unique or optimal. From a single user's point of view, interference from other users is viewed as noise. The user's capacity is maximized when its energy is distributed over the available signal space that is unoccupied by noise. In certain embodiments, a multi-user bit loading technique may be used simultaneously by all users for rate and power allocation to converge to a point that represents a Nash equilibrium for the system.

The multi-user bit loading approach in accordance with embodiments of the invention may include two stages: an inner stage in which each user minimizes its power in order to achieve a target rate for the user, and an outer stage in which the total power allocation for each user is determined.

At the inner stage of the bit loading process, a specific rate constraint is applied to each user and each user minimizes the power allocation to achieve the target rate. Power minimization for a target rate is performed iteratively until the power allocations of all users converge.

The outer stage finds the total power constraint for each user. When total power constraints can be controlled, each user's total power may be adjusted. When the resulting total rate for a certain user is smaller than the target rate for the user, the total power budget for that user is increased and the inner stage is run again. When the total rate for a certain user is equal to the target rate, the total power budget for that user is reduced and the inner stage is run again. This outer stage converges only when the set of target rates is within the system rate region.

Figure 13:
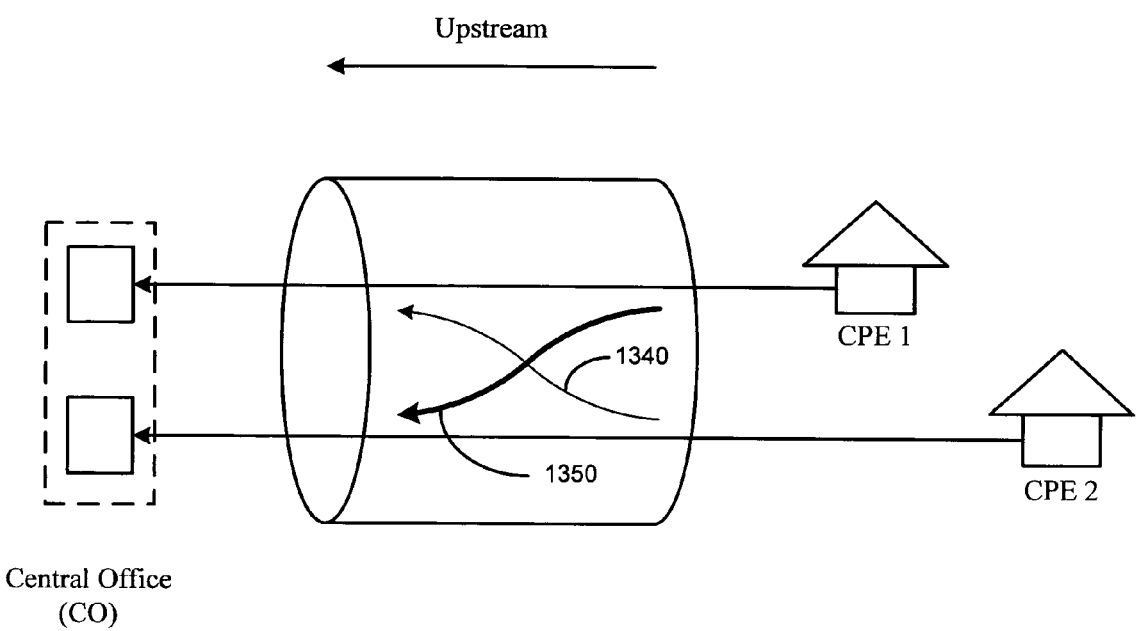
FIG. 13 is a diagram illustrating a DSL system subject to the near-far problem for which a multi-user bit and power allocation procedure is implemented in accordance with embodiments of the invention.

A further embodiment of the invention addresses the near-far situation illustrated in FIG. 13. In this example, CPE 1 is located closer to the central office (CO) that CPE 2. In this situation, the FEXT 1350 induced by CPE 1 in the communication signal transmitted from CPE 2 may be large in comparison with the FEXT 1340 induced by CPE 2 on the signal of CPE 1. In some situations, this may cause the data rate of far user (CPE 2) to be excessively decreased due to the crosstalk induced by the near user (CPE 1).

Figure 14:
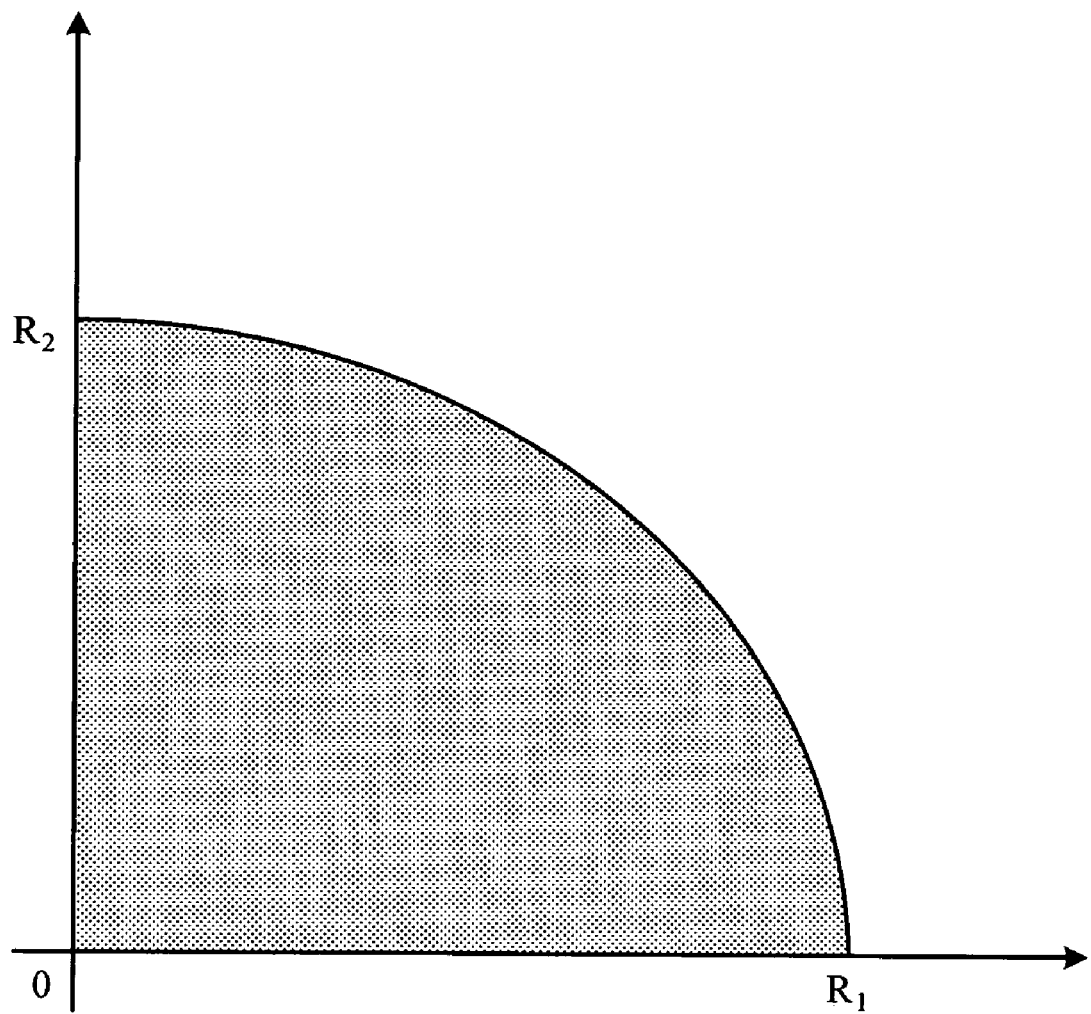
FIG. 14 is a graph illustrating a rate region that may be utilized for a multi-user bit and power allocation in accordance with embodiments of the invention having two users.

Rate and power allocation attempts to enhance the rate region for the best trade offs between far users and near users. The rate region for a multi-user, multi-carrier communication system may be expressed as follows:

$$\{(R_1, R_2, \ldots R_N) : P_i \leq P_{max,i}, i=1,2,\ldots M\} \quad (23)$$

where $P_{max,i}$ is the maximum power of user i and $P_i$ and $R_i$ are the power and data rate of user i, respectively. An example of the rate region for a two-user system is illustrated in FIG. 14.

In accordance with embodiments of the invention, a power and rate allocation technique involves allocating rate and power for near and far users. This process includes adding a weighting factor to the cost function used to represent the power expenditure required to increase the bit rate in a subchannel by an incremental amount. The modified cost function is a weighted sum of the incremental power and may be expressed as:

$$C(n, i) = \sum_{j=1}^{M} \omega_j \Delta P_j(n, i) \quad (24)$$

where $T_j$ is the weight of user j and $\Delta P_j(n,i)$ is the incremental power of user j required to add one bit to user i in subchannel n.

When the modified cost function is used, the decreasing $T_j$ causes the cost function to become insensitive to the power increase of user j. Thus, in the context of the bit allocation techniques described above, good subchannels may be increasingly occupied by user j and the data rate of user j may be increased. Conversely, increasing $T_j$ causes the cost function to become sensitive to power increase of user j. Good subchannels are less frequently occupied by user j and the data rate of user j may be decreased.

In the context of the distributed multi-user bit loading procedure described above, the use of the weighting factors for the cost function involves changing $T_j$ in the outer loop to change the rate of user j. For example, $T_j$ may be increased to decrease the data rate of user j or $T_j$ may be decreased to increase the data rate of user j.

The various embodiments of the invention described above involve communication parameter determination that includes balancing the user data rates and interference emission impacting other users in the system. The transmission power of users generates interference emissions affecting other users in the system. The approaches described herein involve power reduction to allow harmonious operation of the users.

In another more specific example in which various ones of the above-described system-communications parameters can be separately treated, modifications thereof are realized by adjusting the parameters (as permitted by system constraints and specifications) so as to realize performance closest to capacity achieving coding and power allocation scheme. These optimization aspects are described in the article forming part of the above-cited underlying provisional application, the article being entitled "*The Capacity Region Of Frequency Selective Gaussian Interference Channels Under Strong Interference*," by Seong Taek Chung and John M. Cioffi.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of operating a multi-carrier communication system, comprising:
    providing a target bit rate for a user channel of the communication system;
    determining total channel power as a function of incremental bit rate allocations to at least one subchannel of the user channel and as a function of interference on at least one other subchannel due to the incremental bit rate allocation;
    allocating the target bit rate among subchannels of the user channel as a function of the total channel power associated with the bit rate allocation; and
    calculating the power allocation for the user channel based on the bit rate allocation.

2. The method of claim 1, wherein allocating the target bit rate among the subchannels as a function of the total channel power comprises allocating the target bit rate among the subchannels to reduce total power utilization of the user channel.

3. The method of claim 1, wherein allocating the target bit rate among the subchannels comprises:
    iteratively identifying the subchannels as a function of the total channel power associated with changing bit rates of the identified subchannels; and
    adjusting the bit rates of the identified subchannels.

4. The method of claim 3, wherein iteratively identifying the subchannels as a function of the channel power comprises:
    determining a power utilization of the user channel, the power utilization associated with adding a bit to a bit rate of each subchannel; and
    identifying a particular subchannel associated with a lower power utilization.

5. The method of claim 3, wherein adjusting the bit rates of the identified subchannels comprises incrementing the bit rates.

6. The method of claim 1, wherein allocating the target bit rate comprises allocating upstream and downstream bit rates for the subchannels.

7. A method of operating a multi-carrier, multi-user communication system, comprising:
providing a target bit rate for the communication system;
calculating a total system power necessary to increase a bit rate of a subchannel as a function of changes, responsive to the increase of the bit rate, in signal-to-noise ratios of other subchannels;
allocating the target bit rate among subchannels of the communication system as a function of the calculated total system power associated with the subchannel bit rate allocation;
allocating the target bit rate among user channels of the communication system as a function of the calculated total system power associated with the user bit rate allocation; and
calculating the power allocation for each user channel based on the bit rate allocation.

8. The method of claim 7, wherein allocating the target bit rate among the subchannels as a function of the system power comprises allocating the bit rate among the subchannels to minimize the calculated total system power.

9. The method of claim 7, wherein allocating the target bit rate among the users as a function of the calculated total system power comprises allocating the bit rate among the user channels to minimize the calculated total system power.

10. The method of claim 7, wherein allocating the target bit rates among the subchannels comprises:
iteratively identifying subchannels as a function of the calculated total system power associated with changing bit rates of the identified subchannels; and
adjusting the bit rates of the identified subchannels.

11. The method of claim 10, wherein:
iteratively identifying subchannels as a function of the calculated total system power associated with changing bit rates of the identified subchannels comprises determining the calculated total system power associated with incrementing bit rates of the identified subchannels; and
adjusting the bit rates of the identified subchannels comprises incrementing the bit rates of the identified subchannels.

12. The method of claim 7, wherein allocating the target bit rates among the user channels comprises:
iteratively identifying user channels as a function of the calculated total system power associated with changing the bit rates of the identified user channels; and
adjusting the bit rates of the identified user channels.

13. The method of claim 12, wherein:
iteratively identifying user channels as a function of the calculated total system power associated with changing bit rates of the identified user channels comprises determining the calculated total system power associated with incrementing bit rates associated of the identified user channels; and
adjusting the bit rates of the identified user channels comprises incrementing the bit rates of the identified user channels.

14. The method of claim 7, wherein allocating the target bit rates among the user channels comprises:
determining a power associated with an increase in bit rate for each user channel; and
applying weighting factors to the power associated with the increase in the bit rate of one or more particular user channels; and
allocating the target bit rate among the user channels using the applied weighting factors.

15. The method of claim 7, wherein allocating the target bit rate among the subchannels comprises allocating upstream and downstream bit rates for the subchannels.

16. The method of claim 7, wherein allocating the target bit rate among subchannels and allocating the target bit rate among user channels comprises allocating the target bit rate among subchannels and allocating the target bit rate among user channels using a distributed approach.

17. The method of claim 7, wherein allocating the target bit rate among subchannels and allocating the target bit rate among user channels comprises allocating the target bit rate among subchannels and allocating the target bit rate among user channels using a centralized approach.

18. The method of claim 7, further comprising communicating the bit rate and power allocations for the user channels and the subchannels to components of the communication system.

19. The method of claim 18, wherein communicating the bit rate and power allocations for the user channels and the subchannels to components of the communication system comprises communicating the bit rate and power allocations during initialization.

20. The method of claim 18, wherein communicating the bit rate and power allocations for the user channels and the subchannels to components of the communication system comprises communicating the bit rate and power allocations during transmission of data.

21. A communication system, comprising:
one or more user channels, each user channel comprising:
a transmitter configured to transmit data over a multi-carrier channel; and
a receiver, communicatively coupled to the transmitter through the multi-carrier channel, and configured to receive the transmitted data; and
control circuitry, coupled to the one or more user channels, and configured to provide a target bit rate for each user channel,
calculate total system power necessary to increase bit rates of subchannels of each user channel as a function of changes in signal-to-noise ratios of other subchannels, the changes responsive to the increase of the bit rates,
allocate the target bit rate among subchannels of each user channel as a function of the calculated total system power associated with the bit rate allocation, and
determine a power allocation for each user channel based on the bit rate allocation.

22. The communications system of claim 21, wherein the control circuitry is further configured to allocate the target bit rate among the user channels as a function of the calculated total system power associated with the bit rate allocation.

23. The communications system of claim 21, wherein the control circuitry is configured to allocate the target bit rate among the subchannels to minimize the system power.

24. The communications system of claim 21, wherein the control circuitry is configured to allocate the target bit rate among the user channels to minimize the system power.

25. The communications system of claim 21, wherein the control circuitry is centralized.

26. The communications system of claim 21, wherein the control circuitry is distributed among the user channels.

27. The communications system of claim 21, wherein the control circuitry is configured to iteratively identify subchannels as a function of the calculated total system power associated with changing bit rates associated with the identified subchannels and adjust the bit rates of the identified subchannels.

28. The communications system of claim 21, wherein the control circuitry is configured to iteratively identify user channels as a function of the calculated total system power associated with changing the bit rates associated with the identified user channels and adjust the bit rates of the identified user channels.

29. The communications system of claim 21, wherein the control circuitry is configured to determine a power associated with an increase in bit rate for each user channel, apply weighting factors to the power associated with the increase in bit rate of one or more particular user channels, and allocate the target bit rate among the user channels using the applied weighting factors.

30. The communications system of claim 21, wherein the control circuitry is configured to allocate upstream and downstream bit rates for the subchannels.

31. The communications system of claim 21, wherein the control circuitry is configured to communicate the bit rate and power allocations for the user channels and the subchannels to components of the communication system.

32. A system for operating a multi-carrier communication system, comprising:
   means for providing a target bit rate for a user channel of the communication system;
   means for determining total channel power as a function of incremental bit rate allocations to at least one subchannel of the user channel and as a function of interference on at least one other subchannel due to the incremental bit rate allocation;
   means for allocating the target bit rate among subchannels of the user channel as a function of the determined total channel power associated with the bit rate allocation; and
   means for calculating the power allocation for the user channel based on the bit rate allocation.

33. The system of claim 32, further comprising:
   means for iteratively identifying the subchannels as a function of the channel power associated with changing bit rates of the identified subchannels; and
   means for adjusting the bit rates of the identified subchannels.

34. The method of claim 32, further comprising:
   means for determining a total power utilization associated with adding a bit to a bit rate of each subchannel; and
   means for identifying a particular subchannel associated with a lower power utilization.

35. A system for operating a multi-carrier, multi-user communication system, comprising:
   means for providing a target bit rate for the communication system;
   means for determining increases in subchannel power necessary to compensate for increased interference between subchannels due to incremental changes in bit rate allocations;
   means for allocating the target bit rate among subchannels of the communication system as a function of total system power associated with the subchannel bit rate allocation;
   means for allocating the target bit rate among user channels of the communication system as a function of total system power associated with the user bit rate allocation; and
   means for calculating the power allocation for each user based on the bit rate allocation.

36. The system of claim 35, further comprising means for allocating the bit rate among the subchannels to minimize the total system power.

37. The system of claim 35, further comprising allocating the bit rate among the user channels to minimize the total system power.

38. The system of claim 35, further comprising:
   means for iteratively identifying subchannels as a function of the system power associated with changing bit rates of the identified subchannels;
   means for adjusting the bit rates of the identified subchannels;
   means for iteratively identifying user channels as a function of the system power associated with changing the bit rates of the identified user channels; and
   means for adjusting the bit rates of the identified user channels.

39. The system of claim 35, further comprising:
   means for determining a power associated with an increase in bit rate for each user channel;
   means for applying weighting factors to the power associated with the increase in the bit rate of one or more particular user channels; and
   means for allocating the target bit rate among the user channels using the applied weighting factors.

40. The system of claim 35, further comprising means for allocating upstream and downstream bit rates for the subchannels.

41. The system of claim 35, further comprising means for allocating the target bit rate among subchannels and allocating the target bit rate among user channels using a distributed approach.

42. The system of claim 35, further comprising means for allocating the target bit rate among user channels using a centralized approach.

43. The system of claim 35, further comprising means for communicating the bit rate and power allocations for the user channels and the subchannels to components of the communication system.

* * * * *

UNITED STATES PATENT AND TRADEMARK OFFICE
CERTIFICATE OF CORRECTION

PATENT NO. : 7,593,426 B1 Page 1 of 1
APPLICATION NO. : 10/842710
DATED : September 22, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1472 days.

Signed and Sealed this

Fourteenth Day of December, 2010

David J. Kappos
*Director of the United States Patent and Trademark Office*